(12) United States Patent
Liu et al.

(10) Patent No.: US 10,409,132 B2
(45) Date of Patent: Sep. 10, 2019

(54) DYNAMICALLY CHANGING VEHICLE INTERIOR

(71) Applicant: INTERNATIONAL BUSINESS MACHINES CORPORATION, Armonk, NY (US)

(72) Inventors: Su Liu, Austin, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/690,466

(22) Filed: Aug. 30, 2017

(65) Prior Publication Data

US 2019/0064624 A1   Feb. 28, 2019

(51) Int. Cl.
| | |
|---|---|
| *G02F 1/163* | (2006.01) |
| *B60Q 3/80* | (2017.01) |
| *B60Q 3/70* | (2017.01) |
| *B60Q 3/217* | (2017.01) |
| *B60Q 3/16* | (2017.01) |
| *B60Q 3/233* | (2017.01) |
| *B60Q 3/283* | (2017.01) |

(52) U.S. Cl.
CPC ............... *G02F 1/163* (2013.01); *B60Q 3/70* (2017.02); *B60Q 3/80* (2017.02); *B60Q 3/16* (2017.02); *B60Q 3/217* (2017.02); *B60Q 3/233* (2017.02); *B60Q 3/283* (2017.02)

(58) Field of Classification Search
CPC ............ B60Q 3/80; B60Q 3/70; B60Q 3/233; B60Q 3/283; B60Q 3/217; B60Q 3/16; G02F 1/163
USPC .......................................... 359/265–275, 900
See application file for complete search history.

(56) References Cited

U.S. PATENT DOCUMENTS

| | | |
|---|---|---|
| 2005/0054381 A1 | 3/2005 | Lee et al. |
| 2006/0024476 A1 | 2/2006 | Leland et al. |
| 2007/0156540 A1 | 7/2007 | Koren et al. |
| 2008/0151038 A1 | 6/2008 | Khouri et al. |
| 2010/0111375 A1 | 5/2010 | Jones |
| 2011/0084852 A1 | 4/2011 | Szczerba |
| 2014/0019398 A1 | 1/2014 | Engel et al. |
| 2014/0046660 A1 | 2/2014 | Kamdar |

(Continued)

FOREIGN PATENT DOCUMENTS

| | | |
|---|---|---|
| DE | 102015209902 A1 | 12/2016 |
| EP | 1946967 A2 | 7/2008 |

(Continued)

OTHER PUBLICATIONS

Wang, et al., "Functional and Smart Materials, Structural Evolution and Structure Analysis," Plenum Publishing Corporation, New York, New York, 1998, 527 pages.

(Continued)

*Primary Examiner* — Tuyen Tra
(74) *Attorney, Agent, or Firm* — Conley Rose, P.C.

(57) ABSTRACT

An apparatus comprising a memory and a processor coupled to the memory. The processor is configured to receive input from a sensor of a vehicle, analyze the received input to determine a mood of a passenger of the vehicle, determine, according to the determined mood of the passenger, whether a color of a chromatic material in the vehicle should be changed, and control the chromatic material in the vehicle to change colors when the color of the chromatic material should change based on the determined mood of the passenger.

19 Claims, 5 Drawing Sheets

(56) References Cited

U.S. PATENT DOCUMENTS

| | | | |
|---|---|---|---|
| 2015/0025403 A1 | 1/2015 | Chang et al. | |
| 2016/0039426 A1 | 2/2016 | Ricci | |
| 2016/0089954 A1 | 3/2016 | Rojas Villaneueva | |

FOREIGN PATENT DOCUMENTS

| | | |
|---|---|---|
| JP | 2004538543 A | 12/2004 |
| JP | 2013000300 A | 1/2013 |
| WO | 2015041991 A1 | 3/2015 |

OTHER PUBLICATIONS

Bollen, et al., "Twitter mood predicts the stock market," arXiv:1010.3003v1 cs.CE, Submitted Oct. 14, 2010, Published Journal of Computational Science, 2(1), Mar. 2011, pp. 1-8.

Saari, et al., "Semantic Computing of Moods Based on Tags in Social Media of Music," IEEE Transactions on Knowledge and Data Engineering, arXiv:1308.1817v1 cs.MM, Aug. 8, 2013 14 pages.

Kiefer, et al., "Mood States Modulate Activity in Semantic Brain Areas during Emotional Word Encoding," Cerebral Cortex Jul. 2007;17:1516-1530 doi:10.1093/cercor/bhl062 Advance Access publication Aug. 22, 2006, 15 pages.

Seeman, ED. et al., "Cognitive Accessibility User Research,W3C First Public Working Draft," https://www.w3.org/TR/coga-user-research/, Jan. 15, 2015, 46 pages.

"Gallup Daily: U.S. Mood," https://www.gallup.com/poll/106915/gallup-daily-us-mood.aspx? downloaded from the Internet Aug. 22, 2017, 3 pages.

Ge, et al, "Magnetochromatic Microspheres: Rotating Photonic Crystals," JACS Articles, Journal of the American Chemical Society, vol. 131, No. 43, Jun. 15, 2009, pp. 15687-15694.

LiKamWa, et al., "MoodScope: Building a Mood Sensor from Smartphone Usage Patterns," ACM 978-1-4503-1672-Sep. 13, 2006, Copyright 2013, 13 pages.

Ismael, "List of 20+ Sentiment Analysis APIs," http://blog.mashape.com/list-of-20-sentiment-analysis-apis/, Apr. 24, 2013, 7 pages.

Hengen, "Magnetochromatic Material Changes Color on Command," Popular Science, http://www.popsci.com/scitech/article/2009-06/magnetochromatic-materi . . . , Jun. 16, 2009, 2 pages.

Nield, "New 'Smart Threads' Can Change the Colour of Your Clothes Instantly," http://sciencealert.com/new-smart-threads-can-change-the-colour-o . . . , May 6, 2016, 4 pages.

"Sentiment Analysis," Wikipedia, https://en.wikipedia.org/wiki/Sentiment_analysis, downloaded from the Internet Aug. 22, 2017, 10 pages.

"Deepermind," The Search for Basic Emotions, http://www.deepermind.com/02clarty.htm, downloaded from the Internet Aug. 22, 2017, 12 pages.

Wang, et al, "Can well-being be measured using Facebook status updates? Validation of Facebook's Gross National Happiness Index," 2012, 19 pages.

Ulinski, et al., "Finding Emotion in Image Descriptions," ACM 978-1-4503-1543-Feb. 12, 2008, Copyright 2012, 7 pages.

US 10,409,132 B2

DYNAMICALLY CHANGING VEHICLE INTERIOR

BACKGROUND

The present disclosure relates to the field of vehicle control, and more specifically to dynamically controlling an appearance of interior surfaces of a vehicle.

Companies that provide transportation services are growing in popularity among passengers, thereby leading to competition among the companies to provide a more preferred service offering than their competitors. One area of focus in providing the more preferred service offering may be improving a passenger's ride experience. The improved ride experience may be achieved, at least in part, by customizing aspects of a vehicle in which the passenger is riding according to characteristics of the passenger.

SUMMARY

In an embodiment of the present disclosure, an apparatus comprising a memory and a processor coupled to the memory. The processor is configured to receive input from a sensor of a vehicle, analyze the received input to determine a mood of a passenger of the vehicle, determine, according to the determined mood of the passenger, whether a color of a chromatic material in the vehicle should be changed, and control the chromatic material in the vehicle to change colors when the color of the chromatic material should change based on the determined mood of the passenger.

In another embodiment of the present disclosure, a computer-implemented method comprising receiving, by a processor, sensor input, determining, by the processor, whether a color change of a chromatic material affixed to a surface of a vehicle should occur from a current color to a new color based on the received sensor input, and changing, by the processor, the current color of at least a portion of the chromatic material in the vehicle to the new color according to the determined color change.

In yet another embodiment of the present disclosure, a computer program product for chromatic material color control, the computer program product comprising a computer readable storage medium having program instructions embodied therewith, the program instructions executable by a processor. Executing the instructions causes the processor to receive input from a sensor of a vehicle, analyze the received input to determine a mood of a passenger of the vehicle, determine, according to the mood of the passenger, whether a color of a chromatic material in the vehicle should be changed, and control the chromatic material in the vehicle to change colors when it is determined that the color of the chromatic material should change based on the mood of the passenger.

DETAILED DESCRIPTION

Figure 1:
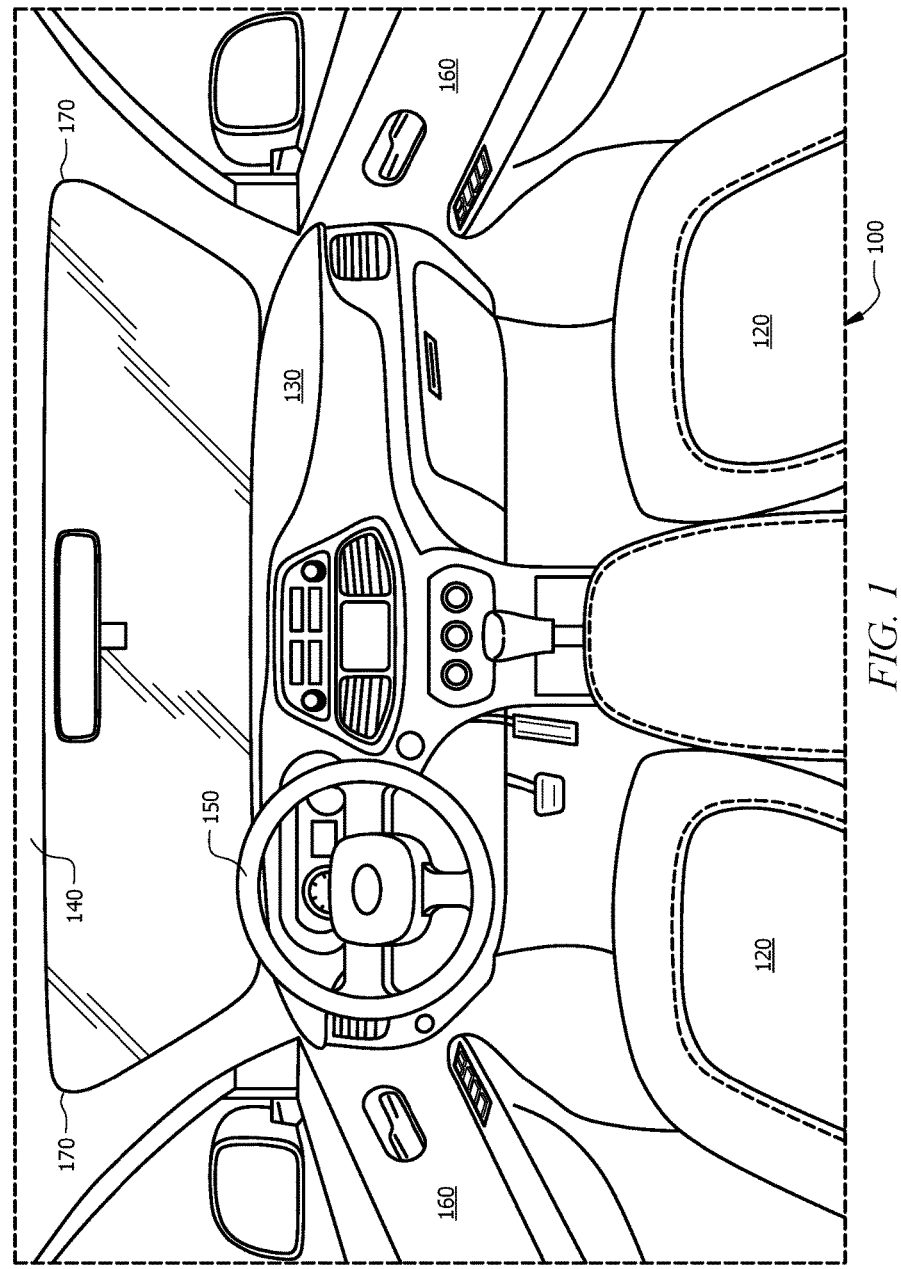
FIG. 1 depicts an illustration of a partial interior of a vehicle having at least some surface areas capable of dynamic color changes in accordance with various embodiments.

Once built, vehicle interiors may include many surface areas and components that are not dynamically changeable. For example, the interior frame, layout and design may be substantially unchangeable. Some features, such as upholstery location, materials, and/or coloring may be changeable, but often at substantial cost and/or time required, and many times by professionals who may be in possession of the vehicle for at least a portion of the time required for the change. Other features such as an amount of light emitted by lights in the vehicle and, as has recently become more prevalent, a color of certain lights installed in limited locations in the vehicles, may be controllable by a driver and/or passenger of the vehicle. Because of the relative inflexibility in changing vehicle interiors, options for improving a passenger's ride experience may include improving factors of the experience related to the passenger's feelings, emotional state, psychology, mood, etc. For some passengers, colors may tend to affect their feelings, emotional state, psychology, mood, etc. For example, warm colors such as red, orange, yellow, and other similar colors or derivatives or combinations of those colors, may tend to correspond to thoughts of sunlight and heat and a feeling of nearness and smaller spaces. Cool colors such as blue, green, some shades of purple, and other similar colors or derivatives or combinations of those colors, may tend to correspond to thoughts of water and sky and a feeling of distance and spaciousness. Varying colors, for some passengers, may also effect physiological, or even physical, conditions of passengers, such as blood pressure, metabolism, eyestrain, stress, etc. In addition, changes in colors (e.g., as a vehicle proceeds along a route through multiple environments such as mountains, plains, and desert climates) may result in stress on certain passengers who may have an aversion or detrimental physical reaction to change.

Disclosed herein are embodiments that provide for dynamically changing colors of surfaces of vehicle interiors. The changes may be at least partially based on geographic, weather, or other environmental characteristics of an environment surrounding the vehicle, for example, at an indicated destination of the vehicle or at a point of embarkation of the vehicle. The changes may also, or alternatively, be at least partially based on a mood of one or more persons in the vehicle (e.g., any one or more of a driver and/or passengers). When a mood of one or more persons in the vehicle is determinable and indicates that a change may be desirable, such that the mood indicates the presence of stress, worry, anger, frustration, etc., a color of at least a portion of the interior surfaces of the vehicle may be changed to a color associated with a changed mood (e.g., relaxed, calm, at ease, etc.). If the mood is subsequently determined to have not changed, the color of at least a portion of the interior surfaces of the vehicle may be changed to another color associated with a changed mood. Any number of color changes may occur until a change in the mood of one or more persons in the vehicle, until one or more persons in the vehicle indicates a desire for no further color changes to occur for a predetermined or prescribed period of time, until a predetermined number of color changes has occurred, or until any other threshold or termination criteria is reached.

Referring now to FIG. 1, an illustration of an embodiment of a partial interior of a vehicle 100 having at least some surface areas capable of dynamic color changes is shown.

The vehicle 100, in some embodiments, may comprise seats 120, dashboard 130, headliner 140, steering wheel 150, door panels 160, and/or frame 170, each of which may be configured to dynamically change surface area colors according to the teaching of the present disclosure. It should be noted that although the vehicle 100 is described as comprising the foregoing components, the vehicle 100 may further comprise any number of additional components or duplicates of described components (e.g., additional seats 120, door panel 160, etc.) at least some of which may also be configured to dynamically change surface area colors according to the teaching of the present disclosure. Additionally, it should be noted that each of the described components may in practice include multiple pieces (e.g., the dashboard 130 and/or frame 170 may each include multiple portions that may be configured to dynamically change surface area colors according to the teaching of the present disclosure either collectively individually for the respective portions). Furthermore, any one or more of the illustrated components of the vehicle 100 may be positioned differently, omitted, covered and/or enclosed by a covering, etc. For example, in some embodiments of the vehicle 100, such as when the vehicle 100 is self-driving and/or autonomous, the steering wheel 150 may be omitted entirely, may be repositioned, may be configured to recess into the dashboard 130 or another component of the vehicle 100 and/or may be covered with an aesthetic or decorative panel that may itself be configured to dynamically change surface area colors according to the teaching of the present disclosure.

In some embodiments, any one or more of the seats 120, dashboard 130, headliner 140, steering wheel 150, door panel 160, and/or frame 170 may be constructed of any suitable base material known to one of ordinary skill in the art such as, for example, metal, plastic, fabric, or any combination thereof. The base material may then be augmented with a chromatic (e.g., color changing) material controllable to change colors according to the present disclosure. For example, a chromatic skin may be applied to the frame 170, chromatic textile may be applied to a panel of the door panel 160 and/or dashboard 130, etc. In other embodiments, the any one or more of the seats 120, dashboard 130, headliner 140, steering wheel 150, door panel 160, and/or frame 170 may be constructed at least partially using the chromatic material. For example, the seats 120 may be constructed at least partially of a chromatic material affixed to a cushion material (e.g., foam).

The chromatic materials may include any materials that are configurable change colors in response to a stimulus or input (e.g., an applied voltage, activation or deactivation of a switch, contact from a passenger such as a touch or press, etc.). For example, the chromatic materials may include chromatic textiles, chromatic thread, chromatic skins (e.g., thin film that adhere to a surface, for example, via an adhesive, a static charge, or other similar methods of adherence), and other such materials. In yet other embodiments, the chromatic material may be capable of displaying an image, a video, and/or other multimedia or visual based content, for example, such that the chromatic material, in whole or in part, may comprise an information display. The information may be, for example, a simulated sky, media content, a game, information obtained via the Internet, a map, etc. Generally, a chromatic material may include a conductive layer (e.g., which may comprise a conductive polymer), a chromatic layer, and an electrolyte. The chromatic material may be sealed inside a transparent or semi-transparent enclosure that may be rigid or flexible. A change in a color of the chromatic material may be induced by an electrical stimulus such as a voltage difference between the conductive layer, chromatic layer, and substrate (if present) of the chromatic material. For example, the conductive layer may be coupled to a power source (e.g., such as a battery of the vehicle, a voltage regulator, or any other source of electrical power) and may be controllable to change voltages. The control may be exerted by a user activating or deactivating a switch, a user physically interacting with the chromatic material (pressing or touching a portion of the chromatic material), by signals transmitted by a controller or microcontroller, or by any other suitable means. The voltage change may then cause a corresponding change in a visible color of the chromatic material.

As discussed above, chromatic materials may be affixed to or incorporated within the construction of any one or more of the seats 120, dashboard 130, headliner 140, steering wheel 150, door panel 160, and/or frame 170. The chromatic materials may be controlled by a same control source (e.g., such that all of the chromatic materials within the vehicle 100 change color substantially concurrently from a same first color to a same second color), or the chromatic materials may be controlled by separate control sources. For example, each of the chromatic materials (and/or chromatic materials covering a respective portion of a component of the vehicle 100 that includes multiple portions, as discussed above) may be controlled independently of at least some of the other chromatic materials. For example, in some embodiments a chromatic material on the headliner 140 may be controllable independently of a remainder of the chromatic materials in the vehicle 100 such that the chromatic material on the headliner 140 may be controllable to give an appearance of the sky or open air (e.g., via presentation of a blue color). Similarly, other components of the vehicle 100 may be individually controllable such that each component having chromatic material in the vehicle 100 is capable of having a color different from a remainder of the components having chromatic material in the vehicle 100. Additionally, the chromatic materials in the vehicle 100 may be controllable in conjunction with any lighting which may be present in the vehicle 100 (e.g., light emitting diodes (LEDs) that may have a selectable color) or may be operated independently of any lights included in the interior of the vehicle 100. For example, the chromatic materials in the vehicle 100 may be controllable separately from lighting in the vehicle 100 such that at a given time at least some of the chromatic materials may be a first color and at least some of the lighting may be emitting light having a second color and a change to the first color (or the second color) may not cause a corresponding change to the second color (or the first color).

The chromatic material may be controlled, for example, via a computing system (not shown). The computing system may be an on-board computer of the vehicle 100 that performs other additional functions (e.g., such as a computing system at least partially used to control infotainment operations of the vehicle 100), a dedicated computing system included within the vehicle 100 for the sole purpose of controlling chromatic material in the vehicle 100 according to various criteria, or a cloud computing system located external to the vehicle 100 that communicates with the vehicle 100 to control the color of at least some of the chromatic material. As such, the vehicle 100 may include network connectivity such that the vehicle 100 is capable of transmitting and/or receiving data via a wireless communications network such as the Internet via cellular communications, satellite communications, or any other suitable for of wireless communications. In some embodiments (e.g., such as when a primary or preferred network connectivity interface or method of the vehicle 100 is not available), the vehicle 100 may prompt a passenger for permission to use a mobile communication device of the passenger as a wireless hotspot for establishing the network connectivity and upon receipt of an affirmative response, may use the mobile communication device of the passenger as the wireless hotspot for establishing the network connectivity. In some embodiments, the computing system may be a cognitive computing system or may include at least some cognitive computing functionality. In some embodiments, at least a first portion of processing associated with controlling the chromatic material in the vehicle 100 may be performed via a computing system included within the vehicle 100 and at least a second portion of processing associated with controlling the chromatic material in the vehicle 100 may be performed via a computing system located external to the vehicle 100 (e.g., such as a cloud computing system). In other embodiments, the computing system located within the vehicle may be a mobile phone communicatively coupled to the vehicle 100 via a wireless (e.g., BLUETOOTH) or a wired coupling.

In some embodiments, the chromatic materials in the vehicle 100 may be controllable based on any one or more of a location (e.g., geographical) of the vehicle 100, environmental conditions surrounding the vehicle 100 (e.g., weather, landscape, etc.), and/or characteristics of one or more persons in the vehicle 100 (e.g., a driver or one or more passengers) such as a mood or emotional state of any of the one or more persons. For example, the chromatic colors may have a predefined default color for use when control is not being exerted over the chromatic material to change a color of the chromatic material. When a mood of one or more persons in the vehicle 100 is determined to be other than happy, a color of at least some of the chromatic material may be changed to one or more colors in an attempt to aid the one or more persons to become happier. If a subsequently determined mood of the one or more persons in the vehicle 100 continues to be other than happy, the color of at least some of the chromatic material may be changed again to one or more other colors in another attempt to aid the one or more persons to become happier. The mood of any of the one or more persons in the vehicle 100 may be determined according to any suitable means such as, for example, audio analysis of utterances of the one or more persons in the vehicle 100, facial analysis of facial expressions of the one or more persons in the vehicle 100, analysis of body movements and/or posture of the one or more persons in the vehicle 100, and/or sensors incorporated into the vehicle 100 and/or worn by any of the one or more persons in the vehicle 100 and communicatively coupled to the vehicle 100 directly or via a service such as a cloud service. Analysis of data obtained in the vehicle 100 by any of the foregoing methods (e.g., microphones, cameras, and/or sensors) may be processed, in some embodiments, by a cognitive computing system to determine the mood of the one or more persons. In some embodiments in which there are multiple persons in the vehicle 100, a mood may be determined for each person individually, or a collective mood of all persons in the vehicle 100 may be determined.

In some embodiments, the color of the chromatic material may be changed based on the determined mood. In cases where multiple persons are in the vehicle 100 and a first person has a first mood and the second person has a second mood, chromatic material adjacent to or near the first person may be changed based on the first mood of the first person, and chromatic material adjacent to or near the second person may be changed based on the second mood of the second person. As previously discussed, if the change in the color of the chromatic material does not result in a mood being subsequently determined to be happy, one or more additional changes in the color of the chromatic material may occur. After a color change, input relating to the color change may be received by the user. The input may be responsive to a prompt provided to the user or may be unsolicited input provided by the user. The input may indicate a preference of the user with respect to the color change, for example, that the color change resulted in an improved mood or that the color change resulted in a decreased or worsened mood. The input received from the user may be used to train a machine learning model and/or to improve an association between colors and moods.

In one example, when a passenger in the vehicle 100 is determined to be confused or suspicious, at least some of the chromatic material in the vehicle 100 may be set to a light purple color that may invoke a mental response of determination on the part of the passenger. In another example, when a passenger in the vehicle 100 is determined to be fearful, at least some of the chromatic material in the vehicle 100 may be set to a light green color that may invoke a mental response of calmness on the part of the passenger. In yet another example, when a passenger in the vehicle 100 is determined to be anxious, at least some of the chromatic material in the vehicle 100 may be set to a yellow color that may invoke a mental response of ease on the part of the passenger. Alternatively, when a passenger in the vehicle 100 is determined to be stressed or tired, at least some of the chromatic material in the vehicle 100 may be set to an orange color that may invoke a mental response of relaxation on the part of the passenger. Further in the alternative, when a passenger in the vehicle 100 is determined to be irritated or frustrated, at least some of the chromatic material in the vehicle 100 may be set to a red color that may invoke a mental response on the part of the passenger of desiring to take a break.

In other embodiments, the chromatic material may be controlled to change colors based at least in part on a location of the vehicle 100 and/or environmental conditions proximate to the vehicle 100. In some embodiments, colors of the chromatic material may be preprogrammed and/or preassigned along a planned route of the vehicle 100 from a first location to a second location. In other embodiments, the colors of the chromatic material may be dynamically chosen or preprogrammed according to weather proximate to the vehicle 100 and/or environmental conditions (such as landscape appearance) proximate to the vehicle 100 or expected to be present along the planned route of the vehicle 100 from the first location to the second location.

For example, when the vehicle 100 travels between a first location and a second location, the vehicle 100 may travel through a plurality of landscapes (e.g., grasslands or plains, deserts or desert-like landscapes, mountains, forests, etc.). Prior to or near a time of departure of the vehicle 100 from the first location, one or more color changes for at least some of the chromatic may be predetermined and/or programmed to the computing system configured to control the chromatic material. In some embodiments, the color changes may be predetermined to occur at particular geographic locations along the route of the vehicle 100 between the first location and the second location. For example, for locations which a forest or predominantly green region is expected or detected by the vehicle 100, at least some of the chromatic material may be set to a green color to correspond to the environment surrounding the vehicle 100 and therefore, for at least some passengers of the vehicle 100, may invoke a mental response on the part of those passengers that creates a feeling of openness rather than isolation from the environment. Similarly, for locations at which a desert region is expected or detected, at least some of the chromatic material may be set to an orange color and for mountainous regions at least some of the chromatic material may be set to a white or silver color. In some embodiments, a color change corresponding to a mood of one or more persons in the vehicle 100 may take precedence over a color change relating to weather or other environmental conditions surrounding the vehicle 100 and/or a preprogrammed or preassigned schedule of color changes.

The color changes may also, or alternatively, be determined based at least partially on weather forecasts at the particular geographic locations along the route of the vehicle 100 and/or environmental or landscape characteristics proximate to, near, or associated with the particular geographic locations along the route of the vehicle 100. For example, for locations at which hot weather is forecast or detected, at least some of the chromatic material may be set to a silver color to give a sense of coolness. Similarly, for locations at which warm weather is forecast or detected by the vehicle 100, at least some of the chromatic material may be set to a light green color, for cool weather an orange color, for cold weather a red color, or various combinations or derivatives of those colors. In this way, a color of the chromatic material may invoke a mental response on the part of at least some passengers in the vehicle 100 that, for those passengers, mitigates at least a portion of an uncomfortable feeling resulting from the forecast or detected weather.

The color changers may also, or alternatively, be determined based at least partially on a distance traveled from the first location (or a most recent stop along the route of the vehicle 100 between the first location and the second location) or an elapsed time since departing the first location (or a most recent stop along the route of the vehicle 100 between the first location and the second location). The color changes may further, or alternatively, be determined based on an estimated distance to the second location (or a next planned stop along the route of the vehicle 100 between the first location and the second location) or an estimated time of travel to the second location (or a next planned stop along the route of the vehicle 100 between the first location and the second location. In these embodiments, the estimated distances and/or times may be used to predict and/or anticipate a potential mode change of one or more passengers of the vehicle 100 due to the distance of travel and/or the duration of travel time. In some embodiments, the anticipated mode change may be determined according to an analysis of historical data of the particular one or more passengers of the vehicle 100 (e.g., based on previous travel of the passengers in the vehicle 100), crowdsourced data from many passengers in many vehicles, medical or other research, and/or other such sources.

While certain colors are described herein as corresponding to certain moods, weather conditions, and/or environments, such correspondence is merely exemplary and is not intended to limit the scope of the present disclosure in any manner. The color correspondence may be changed according to selections of one or more passengers in the vehicle 100, personal preferences which may be learned over time (e.g., by a cognitive computing system or machine learning model), updates based on scientific studies or findings, or any other means of correspondence of colors to either complement or contradict certain moods, weather conditions, or environments.

Figure 2:
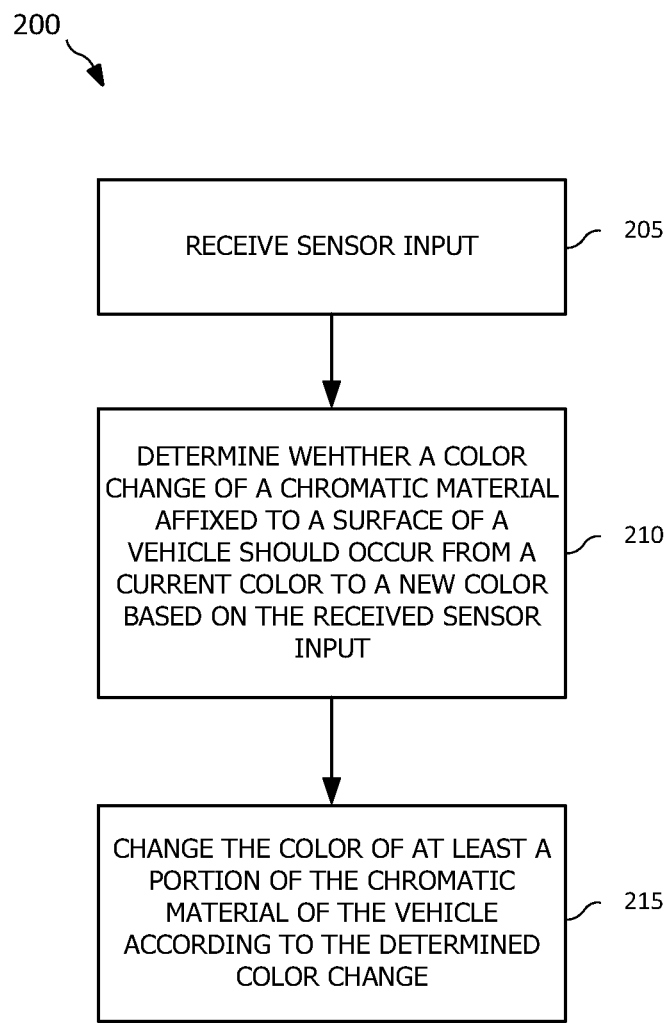
FIG. 2 depicts a flowchart of a method of chromatic material color control in accordance with various embodiments.

Referring now to FIG. 2, a flowchart of an embodiment of a method 200 of chromatic material color control is shown. The method 200 is implemented by a vehicle computing system to implement control of chromatic material in a vehicle such as the vehicle 100 described above with respect to FIG. 1. The vehicle may be a driver-controlled vehicle or may be a partially or fully autonomous or self-driving vehicle. The computing system may be included within the vehicle, may be remote to the vehicle (e.g., a cloud computing system), or may include multiple components, a portion of which are included within the vehicle and a portion of which are external to the vehicle. The chromatic material may be controlled in part (e.g., only part of the chromatic material in the vehicle is changed to a given color based on a given detected condition with other chromatic material being changed to a different color or remaining unchanged) or controlled in full in which all chromatic material is changed to a substantially same color at a substantially same time.

At operation 205, the computing system receives input. In some embodiments, the input is sensor input corresponding to one or more passengers in the vehicle. For example, the input may be received from any one or more of a microphone, a camera, a motion sensor, a pressure sensor, passenger-worn sensors which have been synced by the passenger to the vehicle, or any other sensor that is capable of providing passenger related input to the computing system. Alternatively, in other embodiments, the input may be sensor input corresponding to conditions external to the vehicle such as weather conditions and/or other environmental conditions such as landscape appearances or color palettes. For example, the input may be received from any one or more of a camera, a temperature sensor, a humidity sensor, or any other sensor that is capable of providing environmental related input to the computing system. Alternatively, the input may be received from the user, for example, via an interface of the vehicle such as a touchscreen, knobs, buttons, speech-based control, or other input device.

At operation 210, the computing system determines whether a color change of a chromatic material affixed to a surface of a vehicle should occur from a current color to a new color based on the input received at operation 205. For example, the computing system may determine that a color change should occur when a mood of the passenger is other than happy. As another example, the computing system may determine that a color change should occur when an environmental condition surrounding the vehicle has changed from a previously existing environmental condition. The determination may be made at least partially based on cognitive processing of the input received at operation 205 that may determine the mood of one or more passengers in the vehicle. When the vehicle includes more than one passenger, the mood of each passenger, one passenger, or any number of passengers may be determined. The determination of whether a color change should occur may be based on the mood of any number of the passengers. For example, the color may change if the computing system determines that a color change should occur for any one of the passengers or if the computing system determines that a color change should occur for a majority of the passengers. In some embodiments, the computing system may determine that chromatic material in different portions of the vehicle should change color independently of other portions of the vehicle based on the determined moods of passengers nearest to the chromatic material in those respective portions of the vehicle. When the computing system determines that a color change should occur, the computing system further determines to what color the chromatic material should change.

At operation 215, the computing system changes the color of at least a portion of the chromatic material in the vehicle according to the determinations made at operation 210. Changing the color, in some embodiments, may comprise controlling a voltage applied to at least a portion of the chromatic material. Controlling the voltage applied to at least a portion of the chromatic material may be performed by applying a voltage to a switch to cause the switch to close, removing an applied voltage from a switch to cause the switch to open, controlling an electrical component (e.g., a processor, a voltage regulator, etc.) to output a control voltage to control the chromatic material to change colors, etc. A particular color to which the chromatic material is set may be determined according to a predetermined mapping between colors and moods, weather, and/or environments, as discussed above with respect to FIG. 1, preferences of the passenger learned by the computing system, input received from the user, or any combination thereof.

In some embodiments, the computing system further determines whether the mood of the passenger has changed subsequent to the color change of the chromatic material. The determination of the mood change may be implemented as another step in the method 200, or the method 200 may proceed from operation 215 to operation 200 to receive new input. When the mood of the passenger has not changed, the computing system may change the color of at least some of the chromatic material to a second color, for example, based on an order of preference of the passenger that has been input by the passenger or learned by the computing system.

Figure 3:
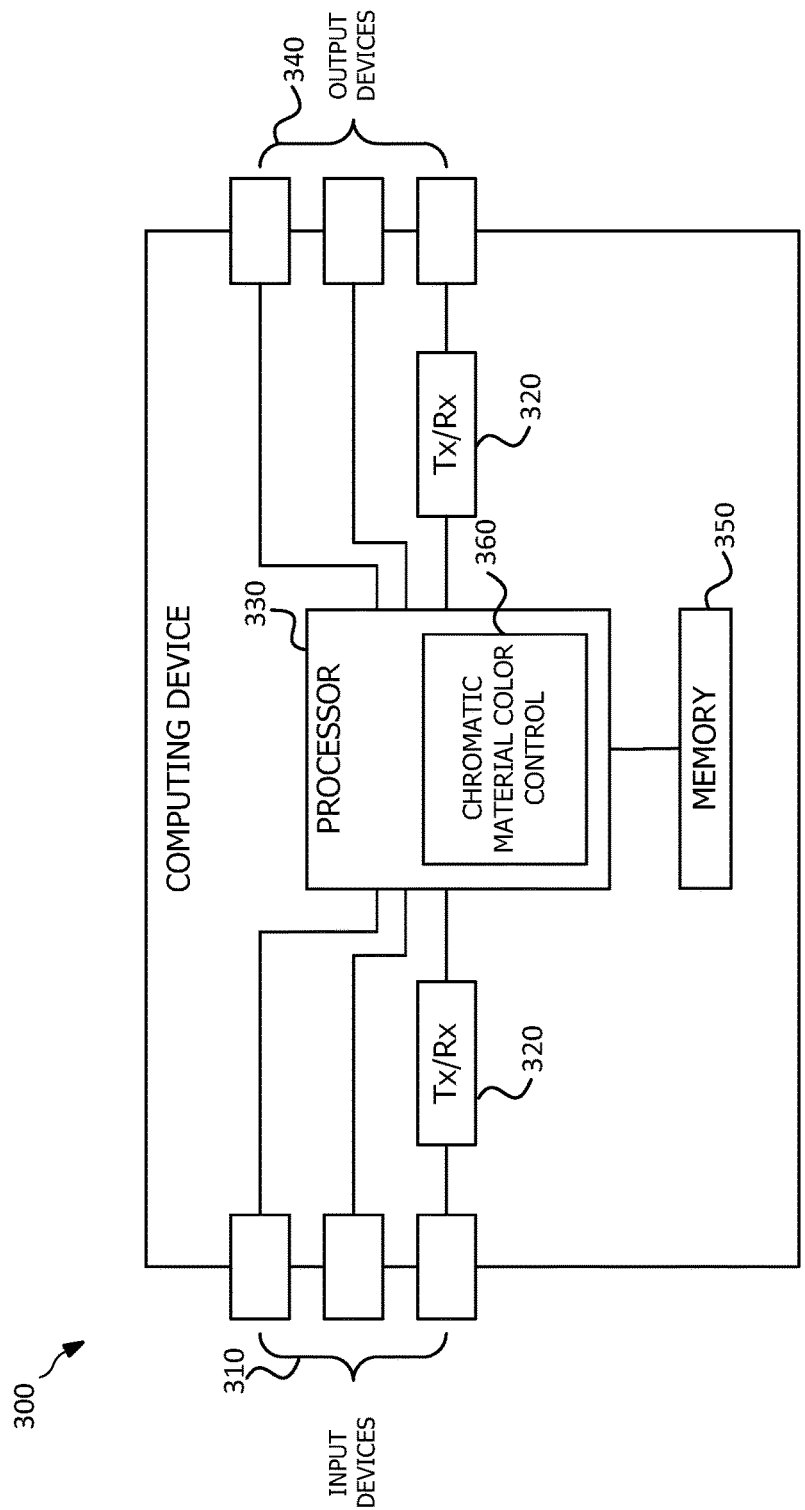
FIG. 3 depicts a computing device in accordance with various embodiments.

With reference now to FIG. 3, a schematic diagram of a computing device 300 according to various embodiments is shown. Computing device 300 may be any suitable processing device capable of performing the functions disclosed herein such as a computer system, a server, a cloud computing node, a cognitive computing system, or may be generally representative of a distributed computing device in which one or more components of computing device 300 are distributed or shared across one or more devices. Computing device 300 is configured to implement at least some of the features/methods disclosed herein, for example, the dynamic control of colors of chromatic materials affixed to surface areas of a vehicle based on passenger mood and/or environmental conditions, such as described above with respect to illustration 100 and/or method 200. In various embodiments, for instance, the features/methods of this disclosure are implemented using hardware, firmware, and/or software (e.g., such as software modules) installed to run on hardware.

Computing device 300 is a device (e.g., a computer system, a user equipment, a network device, a server, a cloud computing node, an automated assistant, a robotic system, etc.) that receives input relating to a vehicle passenger's mood and/or environmental conditions proximate to the vehicle, determines whether a color change of chromatic materials affixed to surfaces areas within the vehicle is appropriate based on an analysis of the received input, and controls at least some of the chromatic materials to change colors according to the determination. The computing device 300 may be an all-in-one device that performs each of the aforementioned operations, or the computing device may be a node that performs any one or more, or portion of one or more, of the aforementioned operations. For example, in at least some embodiments, the computing device 300 is at least partially implemented as a computing system in a vehicle. In one embodiment, the computing device 300 is an apparatus and/or system configured to implement dynamic control of colors of chromatic materials affixed to surface areas of a vehicle based on passenger mood and/or environmental conditions as described with respect to illustration 100 and/or method 200, for example, according to a computer program product executed on, or by, at least one processor.

The computing device 300 comprises one or more input devices 310. Some of the input devices 310 may be microphones, keyboards, touchscreens, buttons, toggle switches, cameras, motion sensors, pressure sensors, temperature sensors, environmental sensors, and/or other devices that allow a user to interact with, and provide input to, the computing device 300. Some other of the input devices 310 may be downstream ports coupled to a transceiver (Tx/Rx) 320, which are transmitters, receivers, or combinations thereof. The Tx/Rx 320 transmits and/or receives data to and/or from other computing devices via at least some of the input devices 310. Similarly, the computing device 300 comprises a plurality of output devices 340. Some of the output device 340 may be speakers, a display screen (which may also be an input device such as a touchscreen), lights, chromatic materials (e.g., such that a color of a visible surface of the material is controllable based on a voltage applied to the chromatic material), or any other device that allows a user to interact with, and receive output from, the computing device 300. At least some of the output devices 340 may be upstream ports coupled to another Tx/Rx 320, wherein the Tx/Rx 320 transmits and/or receives data from other nodes via the upstream ports. The downstream ports and/or the upstream ports may include electrical and/or optical transmitting and/or receiving components. In another embodiment, the computing device 300 comprises one or more antennas (not shown) coupled to the Tx/Rx 320. The Tx/Rx 320 transmits and/or receives data from other computing or storage devices wirelessly via the one or more antennas.

A processor 330 is coupled to the Tx/Rx 320 and at least some of the input devices 310 and/or output devices 340 and is configured to implement dynamic control of colors of chromatic materials affixed to surface areas of a vehicle based on passenger mood and/or environmental conditions. In an embodiment, the processor 330 comprises one or more multi-core processors and/or memory modules 350, which functions as data stores, buffers, etc. The processor 330 is implemented as a general processor or as part of one or more application specific integrated circuits (ASICs), field-programmable gate arrays (FPGAs), and/or digital signal processors (DSPs). Although illustrated as a single processor, the processor 330 is not so limited and alternatively comprises multiple processors. The processor 330 further comprises processing logic configured to execute a chromatic material color control computer program product 360 that is configured to implement dynamic control of colors of chromatic materials affixed to surface areas of a vehicle based on passenger mood and/or environmental conditions as described with respect to illustration 100 and/or method 200, discussed above.

FIG. 3 also illustrates that a memory module 350 is coupled to the processor 330 and is a non-transitory medium configured to store various types of data. Memory module 350 comprises memory devices including secondary storage, read-only memory (ROM), and random access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 350 may be used to house the instructions for carrying out the various embodiments described herein. For example, the memory module 350 may comprise the chromatic material color control computer program product 360, which is executed by processor 330.

It is understood that by programming and/or loading executable instructions onto the computing device 300, at least one of the processor 330 and/or the memory module 350 are changed, transforming the computing device 300 in part into a particular machine or apparatus, for example, a chromatic material color control device having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language, and functional programming languages such as Haskell or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
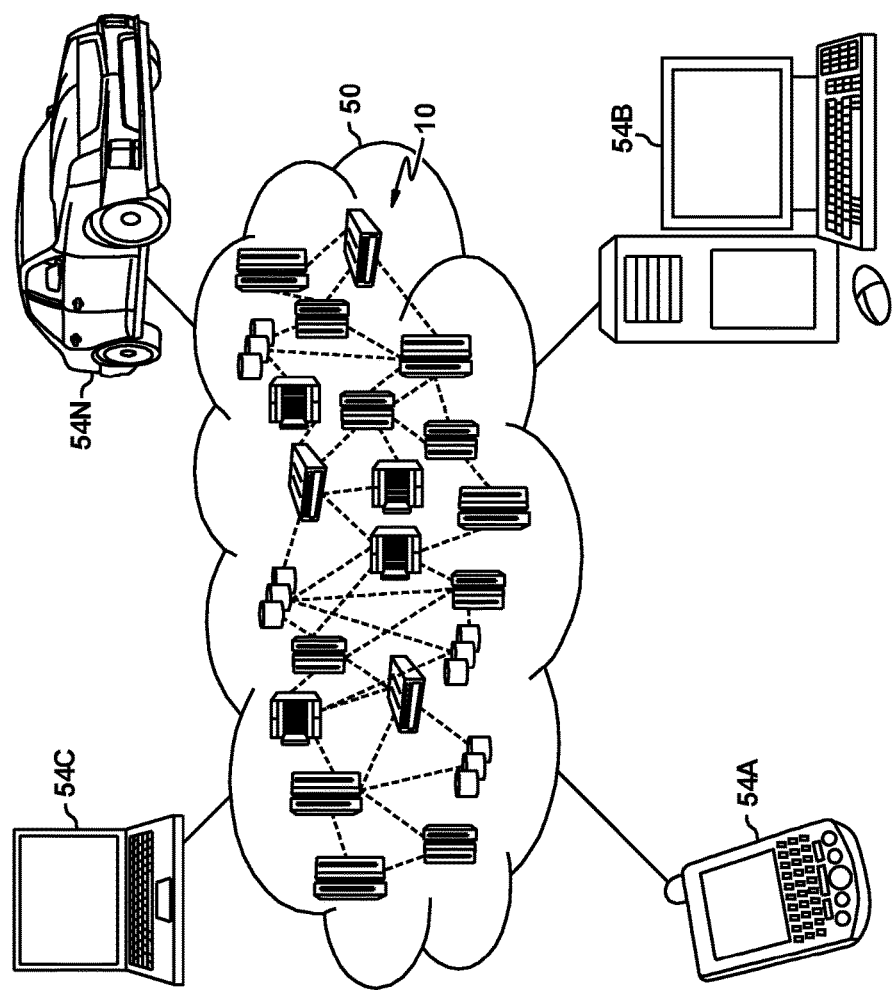
FIG. 4 depicts a cloud computing environment in accordance with various embodiments.
Figure 5:
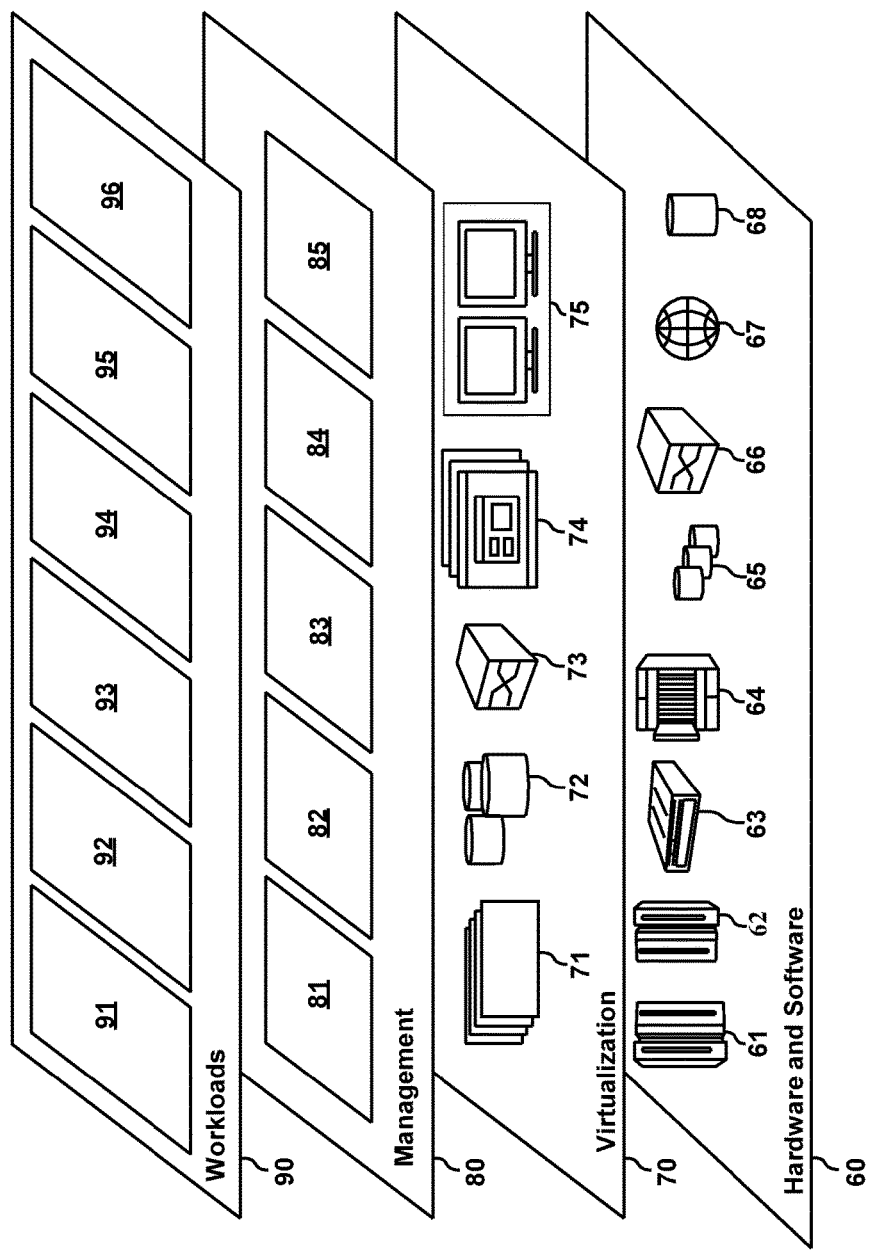
FIG. 5 depicts abstraction model layers in accordance with various embodiments.

Turning now to FIGS. 4 and 5, it is to be understood that although this disclosure includes a detailed description related to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include on-demand self-service, broad network access, resource pooling, rapid elasticity, and/or measured service. On-demand self-service is a characteristic in which a cloud consumer can unilaterally provision computing capabilities, such as server time and network storage, as needed automatically without requiring human interaction with the service's provider. Broad network access is a characteristic in which capabilities are available over a network and accessed through standard mechanisms that promote use by heterogeneous thin or thick client platforms (e.g., mobile phones, laptops, and personal digital assistants (PDAs)). Resource pooling is a characteristic in which the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity is a characteristic in which capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is a characteristic in which cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The cloud model Service Models may include Software as a Service (SaaS), Platform as a Service (PaaS), and/or Infrastructure as a Service (IaaS).

SaaS is a service model in which the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. PaaS is a service model in which the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. IaaS is a service model in which the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include private cloud, community cloud, public cloud, and/or hybrid cloud. Private cloud is a deployment model in which the cloud infrastructure is operated solely for an organization. It may be managed by the organization or a third party and may exist on-premises or off-premises. Community cloud is a deployment model in which the cloud infrastructure is shared by several organizations and supports a specific community that has shared concerns (e.g., mission, security requirements, policy, and compliance considerations). It may be managed by the organizations or a third party and may exist on-premises or off-premises. Public cloud is a deployment model in which the cloud infrastructure is made available to the general public or a large industry group and is owned by an organization selling cloud services. Hybrid cloud is a deployment model in which the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that cloud computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. The hardware and software components of hardware and software layer 60 may serve as the underlying computing components on which cloud computing functions are executed in response to receipt of a request for performance of a function and/or service offered as a part of cloud computing environment 50 such as, for example, the speculative processing described above.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. These virtual entities may enable a subscriber to cloud computing environment 50 to interact indirectly with the hardware and software components of hardware and software layer 60 indirectly via virtual layer 70 without having a specific knowledge of, or interacting directly with, hardware and software layer 60. For example, a plurality of subscribers may interact with virtualization layer 70 to respectively access a corresponding plurality of virtual servers 71 and virtual storage 72 that all exist as separate threads, instances, partitions, etc. on a single server 62 and storage device 65, respectively. In such a scenario, virtualization layer 70 may cause each virtual server 71 and virtual storage 72 to appear to each subscriber as a dedicated and seamless computing and storage device, while enabling efficient operation of the hardware and software components of hardware and software layer 60 by reducing a potential for redundancy of components.

In one example, management layer 80 may provide the functions described below via an abstraction layer such that a subscriber to cloud computing environment 50 may interact with virtualization layer 70 and/or hardware and software layer 60 indirectly via management layer 80 without having a specific knowledge of, or interacting directly with, virtualization layer 70 and/or hardware and software layer 60. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Management layer 80 enables a subscriber to cloud computing environment 50 to interact with cloud computing environment 50 through management layer 80 to perform tasks and functions (e.g., administrative tasks) separate from actual execution of functions in the cloud computing environment 50. For example, an administrator may request access to a certain amount of computing resources (e.g., as provided in virtualization layer 70 and/or hardware and software layer 60) in cloud computing environment 50 via management layer 80 without having a specific knowledge of, or interacting directly with, virtualization layer 70 and/or hardware and software layer 60.

Workloads layer 90 provides examples of functionality for which the cloud computing environment may be utilized. The workloads and functions illustrated in workloads layer 90 are merely exemplary workloads and functions that may be executed in cloud computing environment 50 at the request or direction of a subscriber to cloud computing environment 50, and are not limited to those explicitly recited herein. Examples of workloads and functions which may be provided from this layer include: mapping and navigation 91; software development and lifecycle management 92; virtual classroom education delivery 93; data analytics processing 94; transaction processing 95; and chromatic material color control 96. These workloads and functions of workloads layer 90 may be end-user applications that enable a subscriber to cloud computing environment 50 to interact with any of management layer 80, virtualization layer 70, and/or hardware and software layer 60 indirectly via workloads layer 90 without having a specific knowledge of, or interacting directly with, any of management layer 80, virtualization layer 70, and/or hardware and software layer 60. In this manner, the subscriber and/or an end user who accesses cloud computing environment 50 may not require any form of specialized knowledge relating to the composition or operation of any of management layer 80, virtualization layer 70, and/or hardware and software layer 60 to perform the workloads and functions of workloads layer 90. In such a scenario, the workloads and functions of workloads layer 90 are said to be abstracted from management layer 80, virtualization layer 70, and hardware and software layer 60 because workloads layer 90 hides the underlying operation of management layer 80, virtualization layer 70, and hardware and software layer 60 from the subscriber and/or end-user while still enabling the subscriber and/or end-user to indirectly interact with management layer 80, virtualization layer 70, and/or hardware and software layer 60 to receive the computer processing benefits thereof via workloads layer 90.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other intervening devices and/or connections. Unless otherwise stated, "about," "approximately," or "substantially" preceding a value means +/−10 percent of the stated value or reference.

What is claimed is:

1. An apparatus comprising:
a memory; and
a processor coupled to the memory and configured to:
receive input from a sensor of a vehicle;
analyze the received input to determine a mood of a passenger of the vehicle;
determine, according to the determined mood of the passenger, whether a color of a chromatic material in the vehicle should be changed; and
control the chromatic material in the vehicle to change colors when the color of the chromatic material should change based on the determined mood of the passenger.

2. The apparatus of claim 1, wherein the vehicle comprises controllable lighting, and wherein control and the color of the chromatic material is independent of control and a color of the controllable lighting.

3. The apparatus of claim 1, wherein analyzing the received input to determine the mood of the passenger of the vehicle comprises analyzing the received input at least in part according to cloud-based cognitive computing.

4. The apparatus of claim 1, wherein controlling the chromatic material to change colors comprises controlling an amount of voltage applied to the chromatic material, and wherein an amount of voltage applied to the chromatic material determines a color of the chromatic material.

5. The apparatus of claim 1, wherein the chromatic material is affixed to an interior surface area of the vehicle.

6. The apparatus of claim 1, wherein an interior surface area of the vehicle is constructed of the chromatic material.

7. The apparatus of claim 1, wherein the chromatic material in the vehicle comprises a first portion and a second portion, and wherein controlling the chromatic material in the vehicle to change colors comprises controlling the first portion to change colors to a first color and leaving the second portion unchanged.

8. The apparatus of claim 7, wherein controlling the chromatic material in the vehicle to change colors further comprises controlling the second portion to change colors to a second color different than the first portion.

9. A computer-implemented method comprising:
receiving, by a processor, sensor input;
determining, by the processor, whether a color change of a chromatic material affixed to a surface of a vehicle should occur from a current color to a new color based on the received sensor input according to a process comprising:
determining whether an environmental condition surrounding the vehicle has changed from a previously existing environmental condition based on the sensor input; and
determining that the color change of the chromatic material should occur when the environmental condition surrounding the vehicle has changed from the previously existing environmental condition; and
changing, by the processor, the current color of at least a portion of the chromatic material of the vehicle to the new color according to the determined color change.

10. The computer-implemented method of claim 9, wherein the process further comprises:
analyzing the received sensor input to determine a mood of a passenger of the vehicle; and
determining that the color change of the chromatic material should occur when the mood of the passenger is other than happy.

11. The computer-implemented method of claim 10, further comprising:
determining whether the mood of the passenger has changed after changing the color of at least the portion of the chromatic material in the vehicle; and
changing the current color of at least the portion of the chromatic material in the vehicle to a second color when the mood of the passenger has not changed.

12. The computer-implemented method of claim 9, wherein the process further comprises:
determining a duration of travel and a distance of travel relative to at least one of a starting point of the vehicle or a destination point of the vehicle;
determining an anticipated mode change of a passenger based on at least one of the determined duration or travel or the determined distance of travel; and determining that the color change of the chromatic material should occur when the determined anticipated mood change of the passenger is to a mood other than happy.

13. The computer-implemented method of claim 9, wherein changing the current color of at least the portion of the chromatic material in the vehicle comprises controlling a voltage applied to at least the portion of the chromatic material in the vehicle.

14. A computer program product for chromatic material color control, the computer program product comprising a non-transitory computer readable storage medium having program instructions embodied therewith, the program instructions executable by a processor to cause the processor to:

receive input from a sensor of a vehicle;
analyze the received input to determine a mood of a passenger of the vehicle;
determine, at least partially according to the mood of the passenger, whether a color of a chromatic material in the vehicle should be changed; and
control the chromatic material in the vehicle to change colors when it is determined that the color of the chromatic material should change based at least partially on the mood of the passenger.

15. The computer program product of claim 14, wherein the processor further:

receives input from the passenger indicating a preference of the passenger with respect to the color change of the chromatic material in the vehicle; and
utilizes the input as training data to, at least partially, influence subsequent color changes of the chromatic material in the vehicle.

16. The computer program product of claim 14, wherein prior to controlling the chromatic material in the vehicle to change colors, the color of the chromatic material is determined at least partially according to a preassigned association between the color of the chromatic material and at least one of a geographic location or a weather condition.

17. The computer program product of claim 14, wherein the processor controlling the chromatic material in the vehicle to change colors when the color of the chromatic material should change based on the mood of the passenger comprises controlling a voltage provided to at least some of the chromatic material in the vehicle.

18. The computer program product of claim 14, wherein the processor further:

determines an environmental condition surrounding the vehicle;
determines, at least partially according to the environmental condition surrounding the vehicle, whether the color of the chromatic material in the vehicle should be changed; and
controls the chromatic material in the vehicle to change colors when the color of the chromatic material should change based at least partially on the environmental condition surrounding the vehicle.

19. The computer program product of claim 14, wherein the processor controlling the chromatic material in the vehicle to change colors is performed independently of any control of lighting in the vehicle.

* * * * *